US010316686B2

(12) United States Patent
Hudson et al.

(10) Patent No.: US 10,316,686 B2
(45) Date of Patent: Jun. 11, 2019

(54) HIGH RESPONSE TURBINE TIP CLEARANCE CONTROL SYSTEM

(71) Applicant: United Technologies Corporation, Hartford, CT (US)

(72) Inventors: Eric A. Hudson, Harwinton, CT (US); Stephen K. Kramer, Cromwell, CT (US)

(73) Assignee: United Technologies Corporation, Farmington, CT (US)

(*) Notice: Subject to any disclaimer, the term of this patent is extended or adjusted under 35 U.S.C. 154(b) by 393 days.

(21) Appl. No.: 15/359,066

(22) Filed: Nov. 22, 2016

(65) Prior Publication Data

US 2017/0159483 A1 Jun. 8, 2017

Related U.S. Application Data

(60) Provisional application No. 62/263,459, filed on Dec. 4, 2015.

(51) Int. Cl.
*F01D 11/22* (2006.01)
*F01D 25/24* (2006.01)

(52) U.S. Cl.
CPC .......... *F01D 11/22* (2013.01); *F01D 25/246* (2013.01); *F05D 2220/32* (2013.01); *F05D 2240/11* (2013.01); *F05D 2260/53* (2013.01); *F05D 2260/56* (2013.01); *F05D 2260/57* (2013.01); *F05D 2270/20* (2013.01)

(58) Field of Classification Search
CPC .......... F01D 11/22; F01D 11/20; F01D 11/14; F01D 25/246
See application file for complete search history.

(56) References Cited

U.S. PATENT DOCUMENTS

| 3,085,398 A | 4/1963 | Frederick |
| 2007/0020095 A1 | 1/2007 | Dierksmeier et al. |
| 2013/0209240 A1 | 8/2013 | McCaffrey |
| 2014/0271147 A1 | 9/2014 | Uskert et al. |
| 2015/0218959 A1* | 8/2015 | Barb ............... F01D 11/22 415/173.1 |

FOREIGN PATENT DOCUMENTS

| DE | 846342 | 8/1952 |
| DE | 6602509 | 5/1969 |
| EP | 0879462 | 10/2001 |
| EP | 1655455 | 5/2006 |
| WO | 2014186002 | 11/2014 |

OTHER PUBLICATIONS

European Patent Office, European Search Report dated Apr. 13, 2017 in Application No. 16201950.9.

* cited by examiner

*Primary Examiner* — Jacob M Amick
(74) *Attorney, Agent, or Firm* — Snell & Wilmer, L.L.P.

(57) ABSTRACT

An actuation system according to various embodiments can include an actuation ring having a first end and a second end separated by a gap, the actuation ring being configured to be coupled to a blade outer air seal (BOAS). The actuation system can also include an actuator coupled to at least one of the first end or the second end and configured to adjust a size of the gap such that a tip clearance between the BOAS and a blade tip is reduced in response to the size of the gap being reduced.

18 Claims, 8 Drawing Sheets ance control of gas turbine engines and, more particularly, to an actuation ring for changing tip clearance between a blade tip and a blade outer air seal.

HIGH RESPONSE TURBINE TIP CLEARANCE CONTROL SYSTEM

CROSS-REFERENCE TO RELATED APPLICATIONS

This application is a nonprovisional of, and claims priority to, and the benefit of U.S. Provisional Application No. 62/263,459, entitled "HIGH RESPONSE TURBINE TIP CLEARANCE CONTROL SYSTEM," filed on Dec. 4, 2015, which is hereby incorporated by reference in its entirety.

FIELD

The present disclosure relates generally to active tip clearance control of gas turbine engines and, more particularly, to an actuation ring for changing tip clearance between a blade tip and a blade outer air seal.

BACKGROUND

Gas turbine engines typically include a fan section, a compressor section, a combustor section and a turbine section. The efficiency of the turbine section is affected by tip clearance between a blade tip and a blade outer air seal (BOAS). The BOAS is typically coupled to a case of the gas turbine engine. In response to acceleration of the gas turbine engine, the blade tips can expand outward due to increased heat and centrifugal force at a faster rate than the case expands outward. The tip clearance may be designed to be relatively large due to this rapid expansion of the blade tips relative to the BOAS. Thus, it is desirable to have systems and methods for active tip clearance control.

SUMMARY

Described herein is an actuation system according to various embodiments for tip clearance control. The actuation system includes an actuation ring having a first end and a second end separated by a gap, the actuation ring being configured to be coupled to a blade outer air seal (BOAS). The actuation system also includes an actuator coupled to at least one of the first end or the second end and configured to adjust a size of the gap such that a tip clearance between the BOAS and a blade tip is reduced in response to the size of the gap being reduced.

In any of the foregoing actuation systems, the actuation ring includes a first flange at the first end and a second flange at the second end and wherein the actuator is configured to be coupled to the first flange and the second flange and to adjust the size of the gap by changing a circumferential position of the first flange relative to the second flange.

In any of the foregoing actuation systems, the actuation ring has a first thickness proximal to the gap and a second thickness distal to the gap that is greater than the first thickness.

In any of the foregoing actuation systems, the first end of the actuation ring includes a shiplap slot and the second end of the actuation ring includes a shiplap finger configured to be received by the shiplap slot to allow circumferential movement of the first end relative to the second end.

In any of the foregoing actuation systems, the actuation ring has a U-shaped cross section.

Any of the foregoing actuation systems can also include the BOAS and a fastener configured to extend through the actuation ring and be received by and coupled to the BOAS.

Any of the foregoing actuation systems can also include a sensor coupled to the fastener and wherein the fastener defines a waveguide such that the sensor can detect data corresponding to the tip clearance via the waveguide.

In any of the foregoing actuation systems, the sensor is a microwave sensor.

Any of the foregoing actuation systems can also include a compressible feature configured to be positioned between the fastener and the actuation ring such that compression of the compressible feature by uneven movement of the actuation ring relative to the BOAS causes the BOAS to tend to remain aligned with the BOAS.

In any of the foregoing actuation systems, the actuation ring further includes at least one radial guide configured to be received by a radial guide acceptor of at least one of a forward BOAS support or an aft BOAS support.

In any of the foregoing actuation systems, a BOAS gap may exist between the BOAS and at least one of a forward BOAS support or an aft BOAS support to allow radial movement of the BOAS relative to the at least one of the forward BOAS support or the aft BOAS support.

Also described is a turbine section of a gas turbine engine. The turbine section may include a turbine blade having a blade tip and a blade outer air seal (BOAS). The turbine section may also include an actuation system having an actuation ring having a first end and a second end separated by a gap, the actuation ring being configured to be coupled to the BOAS. The actuation system may also include an actuator coupled to at least one of the first end or the second end and configured to adjust a size of the gap such that a tip clearance between the BOAS and the blade tip is reduced in response to the size of the gap being reduced.

In any of the foregoing turbine sections, the actuation ring includes a first flange at the first end and a second flange at the second end and wherein the actuator is configured to be coupled to the first flange and the second flange and to adjust the size of the gap by changing a circumferential position of the first flange relative to the second flange.

In any of the foregoing turbine sections, the actuation ring has a first thickness proximal to the gap and a second thickness distal to the gap that is greater than the first thickness.

In any of the foregoing turbine sections, the actuation system further includes a fastener configured to extend through the actuation ring and be received by and coupled to the BOAS.

In any of the foregoing turbine sections, the actuation system further includes a compressible feature configured to be positioned between the fastener and the actuation ring such that compression of the compressible feature by uneven movement of the actuation ring relative to the BOAS causes the BOAS to tend to remain aligned with the BOAS.

In any of the foregoing turbine sections, the actuation ring further includes at least one radial guide configured to be received by a radial guide acceptor of at least one of a forward BOAS support or an aft BOAS support.

In any of the foregoing turbine sections, a BOAS gap may exist between the BOAS and at least one of a forward BOAS support or an aft BOAS support to allow radial movement of the BOAS relative to the at least one of the forward BOAS support or the aft BOAS support.

Also described is an actuation system for active tip clearance control. The actuation system can include an actuation ring having at least two sections each separated by a gap and being configured to be coupled to a blade outer air seal (BOAS). The actuation system can also include at least two actuators, each being configured to be coupled to at least one end of adjacent sections of the at least two sections and to adjust the gap between the adjacent sections such that a tip clearance between the BOAS and a blade tip is reduced in response to a size of each gap being reduced.

In any of the foregoing actuation systems, each of the at least two sections includes a shiplap finger and a shiplap slot configured to interface with adjacent shiplap fingers and shiplap slots to allow circumferential movement of each of the at least two sections relative to each other.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
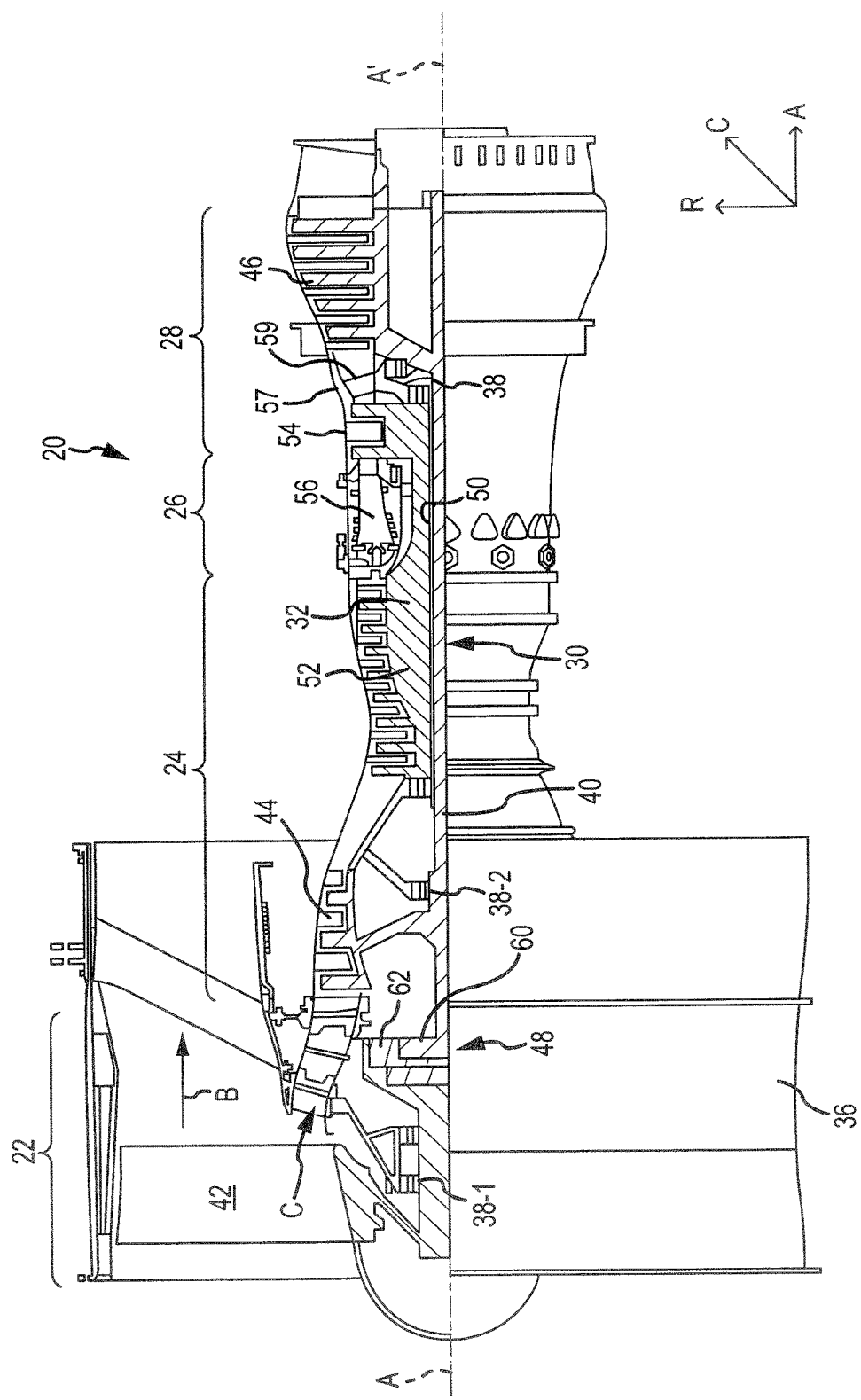
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

Gas turbine engine 20 may be a two-spool turbofan that generally incorporates a fan section 22, a compressor section 24, a combustor section 26 and a turbine section 28. Alternative engines include an augmentor section among other systems or features. In operation, fan section 22 drives air along a bypass flow-path B while compressor section 24 drives air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

Gas turbine engine 20 generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan shaft 98, and thus fan 42, at a lower speed than low speed spool 30. Geared architecture 48 includes a gear assembly 60 enclosed within a gear housing 62. Gear assembly 60 couples inner shaft 40 to a rotating fan structure.

High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass ratio geared aircraft engine. The bypass ratio of gas turbine engine 20 may be greater than about six (6). The bypass ratio of gas turbine engine 20 may also be greater than ten (10:1). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). The diameter of fan 42 may be significantly larger than that of the low pressure compressor section 44, and the low pressure turbine 46 may have a pressure ratio that is greater than about five (5:1). The pressure ratio of low pressure turbine 46 is measured prior to inlet of low pressure turbine 46 as related to the pressure at the outlet of low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2A:
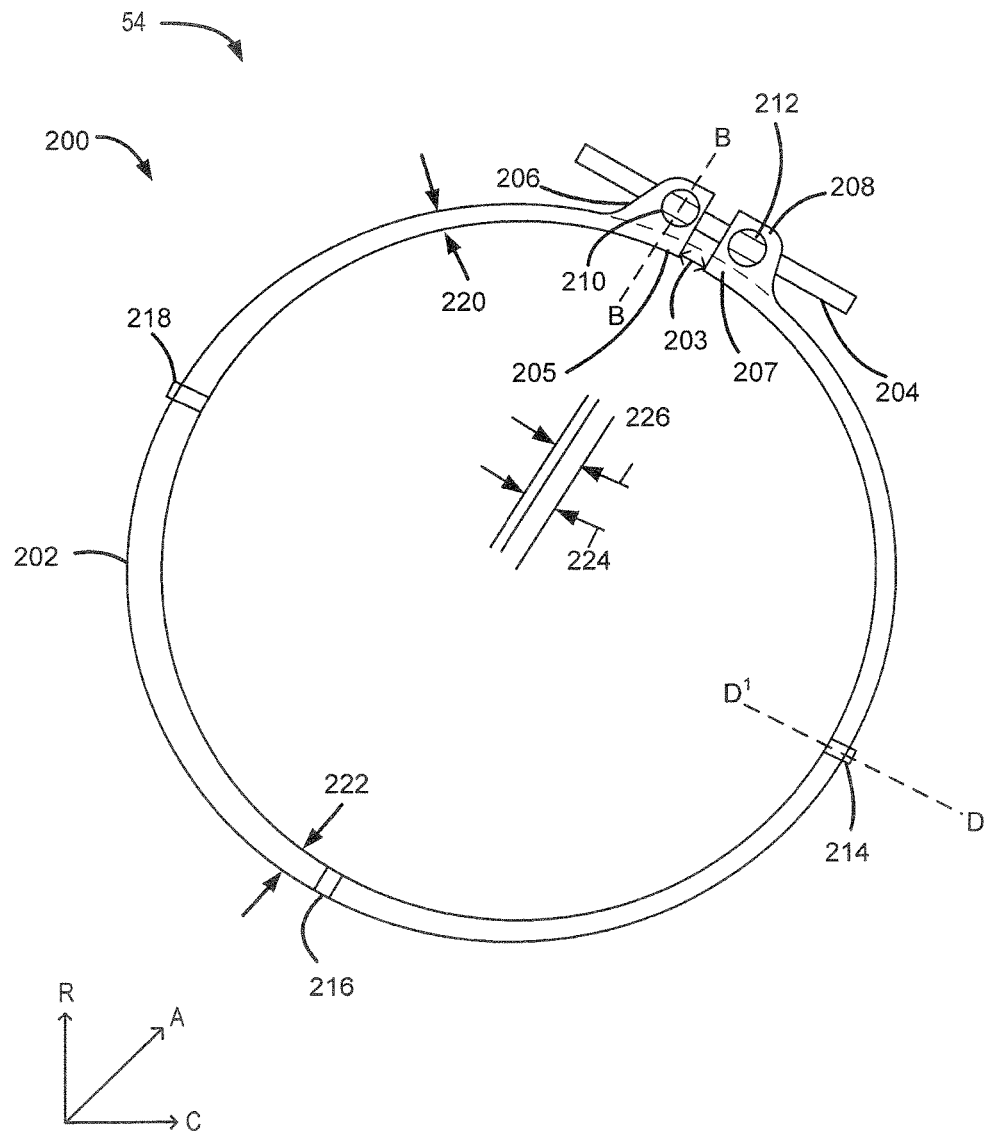
FIG. 2A is a drawing of an actuation system including an actuation ring and an actuator, in accordance with various embodiments.

Referring now to FIG. 2A, an actuation system 200 for use in high pressure turbine section 54 is shown. Actuation system 200 includes an actuation ring 202 and an actuator 204. Actuation ring 202 may be coupled to one or more blade outer air seals (BOAS 302 of FIG. 4) of high pressure turbine section 54 and may be used to adjust tip clearance between blade tips of turbine rotors and one or more BOASs in response to, for example, aircraft maneuvers and engine operating parameters (such as engine idle, takeoff, cruise) or the like.

Actuation ring 202 circumferentially surrounds axis A-A' of FIG. 1 and can be actuated radially inward or radially outward using actuator 204. Actuator 204 may include any type of actuator capable of adjusting a circumference of actuation ring 202. As shown in FIG. 2A, actuator 204 includes a threaded actuator shaft. Actuation ring 202 has a first end 205 and a second end 207. First end 205 includes a first flange 206 having a first opening 210 and second end 207 includes a second flange 208 having a second opening 212. At least one of first opening 210 or second opening 212 may be threaded. First flange 206 and second flange 208 are separated by a gap 203. Actuator 204 is designed to extend through, and be received by, first opening 210 and second opening 212. Because actuator 204 includes the threaded actuator shaft, the size of gap 203 can increase or decrease in response to actuator 204 being rotated in a direction tangential to actuation ring 202.

In response to the size of gap 203 decreasing, the circumference of actuation ring 202 decreases. Likewise, in response to the size of gap 203 increasing, the circumference of actuation ring 202 increases. In response to the circumference of actuation ring 202 increasing, the BOAS is moved radially outward and in response to the circumference of actuation ring 202 decreasing, the BOAS is moved radially inward.

It is desirable for actuation ring 202 to remain symmetrical in response to being actuated. Stated differently, it is desirable for the shape of actuation ring 202 to remain circular and not become deformed in response to actuation. In order to achieve this effect, the thickness of actuation ring 202 may vary about the circumference of actuation ring 202. For example, actuation ring 202 may have a first thickness 220 proximate gap 203 and may have a second thickness 222 at a location distal to gap 203 relative to first thickness 220. In various embodiments, second thickness 222 may be greater than first thickness 220. In response to an actuator being actuated, an actuation ring having an even thickness about its circumference may have a tendency to flex more at a portion of the actuation ring that is distal to a gap than at a portion that is proximal to the gap. Thus, in order to increase the likelihood of actuation ring 202 remaining symmetrical, second thickness 222 is greater than first thickness 220.

The size of gap 203 may vary by at least one thousandth of an inch (0.0254 millimeters (mm)) and up to 0.75 inches (19.05 mm). The size of gap 203 may be selected based on parameters of the particular gas turbine engine, such as engine diameter and operating characteristics. For example, gap 203 of aircraft 20 of FIG. 1 may be 150 mils (3.81 mm). Stated differently, gap 203 can have a first gap distance 224 and a second gap distance 226. In various embodiments, first gap distance 224 may be at least 1 mil (0.0254 mm) greater than second gap distance 226. When the size of gap 203 is changed by 150 mils (3.81 mm), any BOAS coupled to actuation ring 202 may be moved radially by 25 mils (0.64 mm). In various embodiments, this is a desirable amount of radial movement for actively controlling tip clearance between a BOAS and a turbine rotor. However, these distances may vary based on parameters of a particular gas turbine engine.

Actuation ring 202 may also include a plurality of radial guides including a first radial guide 214, a second radial guide 216 and a third radial guide 218. The radial guides 214, 216, 218 may be used to assist in coupling actuation ring 202 to a BOAS and/or to a case of gas turbine engine 20 of FIG. 1. In various embodiments, each radial guide 214, 216, 218 may be coupled to a BOAS.

Figure 2B:
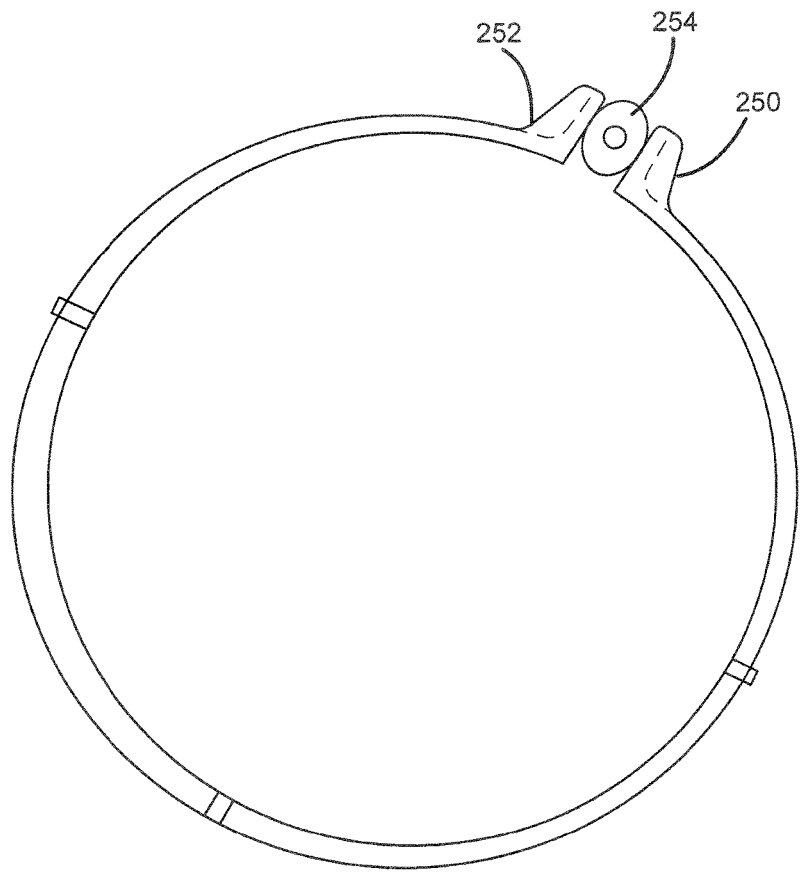
FIG. 2B is a drawing of another actuation system including an actuation ring and an actuator, in accordance with various embodiments.
Figure 2B:
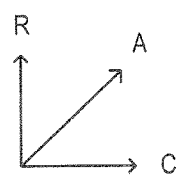

With brief reference now to FIG. 2B, an alternative actuator, such as a cam actuator, may be used. The actuator may include a cam shaft 254 positioned between a first flange 252 and a second flange 250. In response to rotation of cam shaft 254, first flange 252 is forced away from second flange 250. In response to continued rotation of cam shaft 254, first flange 252 can again approach second flange 250.

Figure 2C:
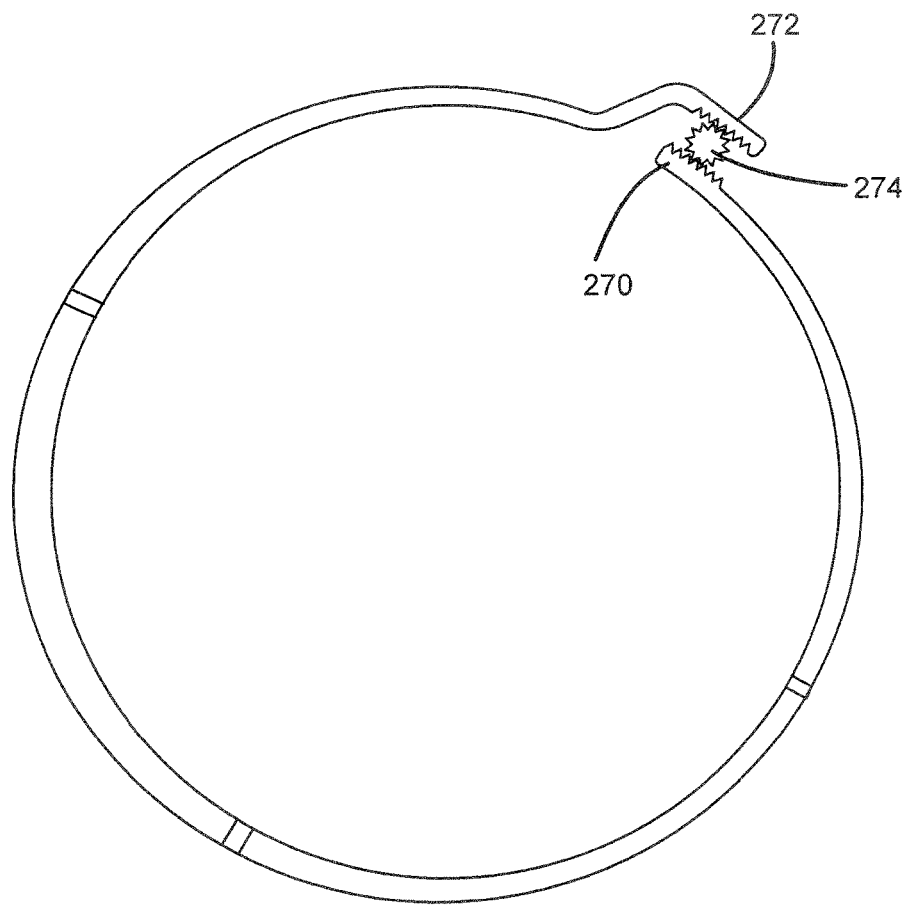
FIG. 2C is a drawing of another actuation system including an actuation ring and an actuator, in accordance with various embodiments.
Figure 2C:
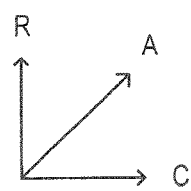

Referring now briefly to FIG. 2C, a gear actuator may also be used for actuating an actuation ring. The gear actuator can include a shiplap feature having a first extension, or flange, 272 and a second extension, or flange, 270. The second extension or flange 270 is positioned radially inward from the first extension or flange 272 to allow circumferential movement of the first extension or flange 272 relative to the second extension or flange 270. The first extension or flange 272 and the second extension or flange 270 may each include teeth. The gear actuator may include a gear shaft 274 also having teeth. In response to rotation of gear shaft 274, first extension or flange 272 and second extension or flange 270 may move circumferentially relative to each other.

Figure 3:
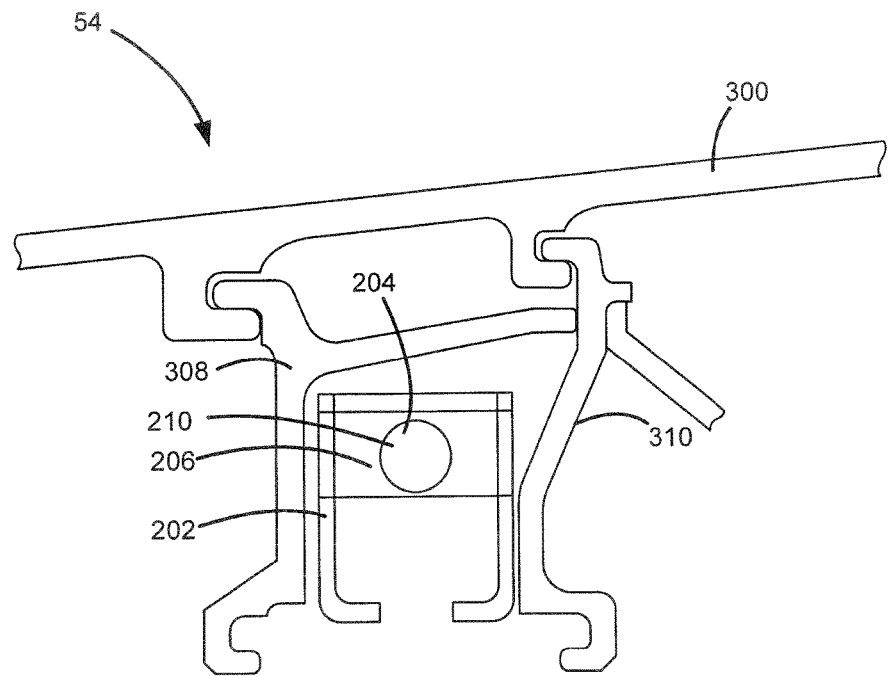
FIG. 3 illustrates a cross-sectional view of the actuation system of FIG. 1 including the actuation ring and the actuator, in accordance with various embodiments.
Figure 3:
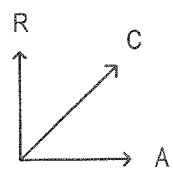

Referring now to FIGS. 2A and 3, a cross-sectional view along section B-B' of actuation system 200 positioned within a case 300 of high pressure turbine section 54 is shown. A forward BOAS support 308 and an aft BOAS support 310 may each be coupled to case 300. As shown in FIG. 3, actuation ring 202 may be positioned between forward BOAS support 308 and aft BOAS support 310. Actuation ring 202 is shown with a U-shaped cross-section, however, one skilled in the art will realize that an actuation ring can have a different shape cross-section without departing from the scope of the disclosure. In various embodiments, it may be preferable for an actuation ring to define an opening, such as the empty space with the U-shape of actuation ring 202, in order to reduce weight.

First flange 206 is shown at a radially outward end of actuation ring 202. First opening 210 is shown within first flange 206 and actuator 204 is shown extending through first flange 206 via first opening 210. Second flange 208 is circumferentially aligned with first flange 206 such that second opening 212 also receives actuator 204.

Figure 4:
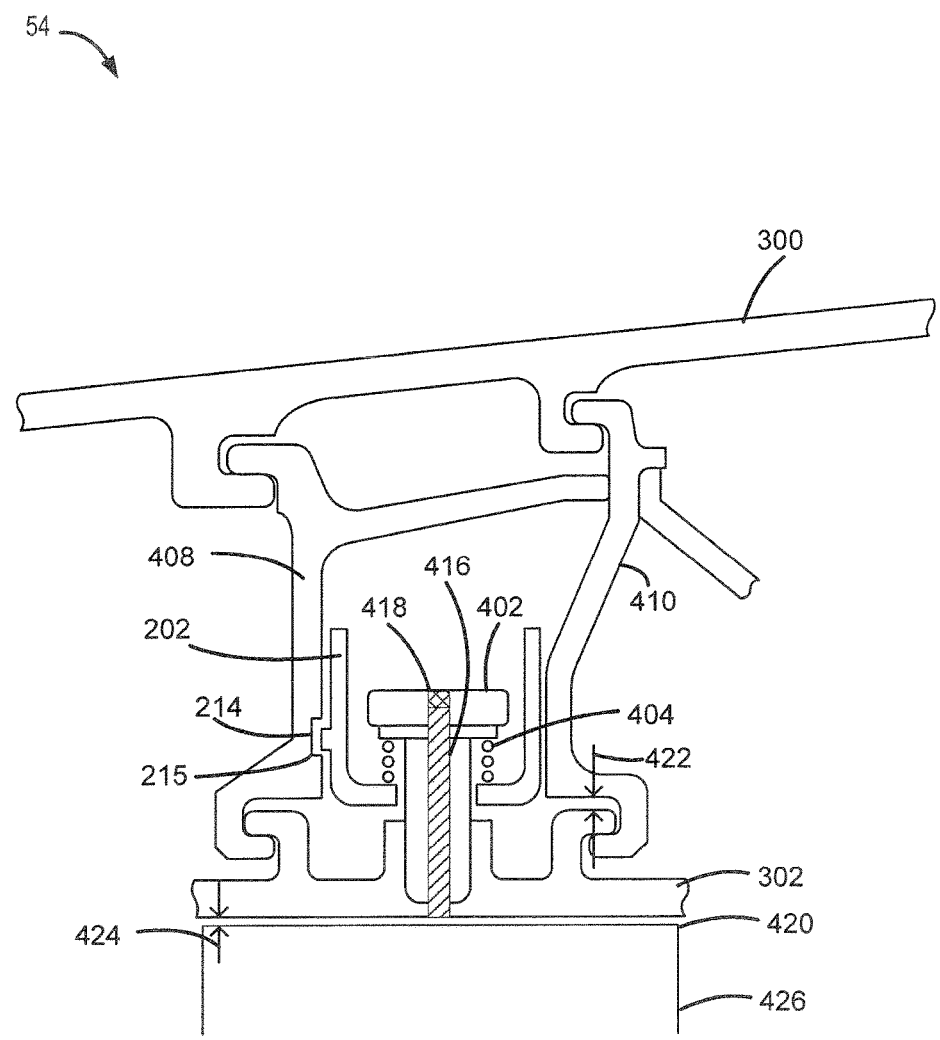
FIG. 4 illustrates a cross-sectional view of the actuation system of FIG. 1 including the actuation ring coupled to a blade outer air seal (BOAS), in accordance with various embodiments.

Referring now to FIGS. 2A and 4, a cross-sectional view of actuation system 200 along section D-D' is shown with actuation ring 202 being coupled to case 300. In that regard, actuation ring 202 may be coupled between a forward BOAS support 408 and an aft BOAS support 410. A BOAS 302 may be coupled to case 300 via forward BOAS support 408 and aft BOAS support 410. A connector 402 extends through actuation ring 202 and couples actuation ring 202 to BOAS 302. A compressible feature 404, such as a spring, may be positioned between connector 402 and actuation ring 202 and be compressed in response to a compression force between connector 402 and actuation ring 202. A tip clearance 424 is shown between a blade tip 420 of a turbine blade 426 and BOAS 302. In response to actuation ring 202 being actuated radially inward, BOAS 302 may be forced radially inward towards blade tip 420 of turbine blade 426, thus reducing a distance of tip clearance 424 in the radial direction.

Although the thickness of actuation ring 202 is designed to reduce uneven flexing of actuation ring 202, actuation ring 202 may not remain symmetrical in response to being actuated. In order to compensate for this potential uneven flexing, compressible feature 404 is included to at least partially counteract the effects of the distorted actuation ring 202 on BOAS 302. For example, if forward side of actuation ring 202 along section D-D' is actuated more than aft section of actuation ring 202 along section D-D', compressible feature 404 may compress more on the forward side of connector 402 than on the aft side of connector 402. As a result, BOAS 302 may remain radially aligned with blade tip 420. Continuing the example and without compressible feature 404, circumferential variation may exist among the various BOAS' that make up the entire outer diameter flowpath of high pressure turbine system 54 and/or BOAS 302 may form an angle with blade tip 420 such that an aft side of BOAS 302 is closer to blade tip 420 than a forward side of BOAS 302.

Forward BOAS support 408, or any other component of case 300, may include a radial guide acceptor 215 that is configured to receive first radial guide 214. For example, radial guide acceptor 215 may include a notch or cavity. As actuation ring 202 is positioned within case 300, radial guide acceptor 215 may be aligned with first radial guide 214. In response to radial guide acceptor 215 being aligned with first radial guide 214, radial guide acceptor 215 may receive first radial guide 214. In response to radial guide acceptor 215 receiving first radial guide 214, radial guide acceptor 215 may resist movement of actuation ring 202 relative to forward BOAS support 408.

High pressure turbine section 54 may be designed such that a BOAS gap 422 exists between forward BOAS support 408 and BOAS 302 as well as between aft BOAS support 410 and BOAS 302. In response to BOAS 302 being actuated relative to case 300, BOAS 302 can also be actuated radially relative to forward BOAS support 408 and/or aft BOAS support 410. BOAS gap 422 allows this radial movement of BOAS 302 relative to forward BOAS support 408 and aft BOAS support 410 with limited force being applied from BOAS 302 to forward BOAS support 408 and aft BOAS support 410, thus extending the operable life of the components. In response to actuation ring 202 being actuated radially outward, actuation ring 202, and thus connector 402 via compressible feature 404, is moved radially outward. Because connector 402 is coupled to BOAS 302, BOAS 302 also moves radially outward relative to case 300. In response, BOAS gap 422 is reduced in size. Thus, it is desirable for BOAS gap 422 to have a distance relatively similar to the maximum distance that BOAS 302 can be actuated relative to case 300.

In response to an instruction to increase or decrease tip clearance 424, actuator 204 may be controlled to change the circumference of actuation ring 202. This allows for a relatively quick response to a request to change tip clearance 424. For example, in various embodiments, the time between the request and the actual change of tip clearance 424 may be less than one second, or less than half of a second, or less than a quarter of a second, or less than a tenth of a second. This is desirable because blade tip 420 may rapidly expand as blade tip 420 increases in angular velocity relative to BOAS 302.

Actuator 204 may be operatively coupled to and controlled by a controller. In various embodiments, this control may be performed by a feed-forward system. In various embodiments, however, actuator 204 may be controlled via a feedback system. In that regard, connector 402 may define a waveguide 416 and may include a sensor 418. In various embodiments, the sensor 418 may be a microwave sensor. Waveguide 416 may extend between sensor 418 and the radially inward end of BOAS 302. Sensor 418 may thus detect a distance between itself and blade tip 420, which can be used to determine tip clearance 424. A controller may then control actuation of actuator 204 based on the detected/determined tip clearance 424.

Referring briefly to FIGS. 1 and 2A, actuation system 200 is shown as being utilized in high pressure turbine section 54. However, one skilled in the art will realize that an actuation system similar to actuation system 200 can be used in low pressure turbine section 46, high pressure compressor section 52 and/or low pressure compressor section 44 without departing from the scope of the disclosure. Furthermore, a similar actuation system can also be used in a power turbine section of a turboshaft, an intermediate pressure compressor of a three spool gas turbine engine and/or an intermediate pressure turbine of a three spool gas turbine engine without departing from the scope of the disclosure.

Figure 5A:
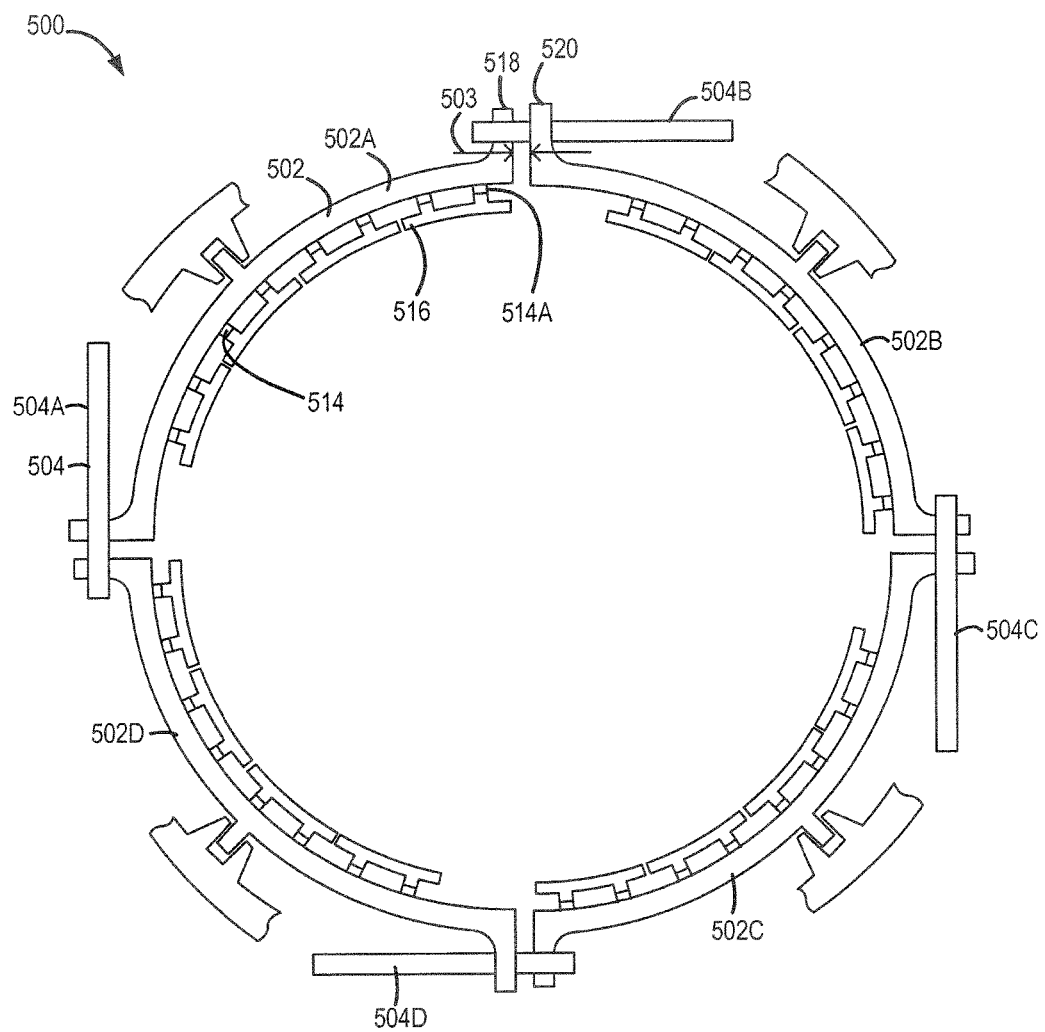
FIG. 5A is a drawing of an actuation system including an actuation ring having four sections and including four actuators, in accordance with various embodiments.
Figure 5A:
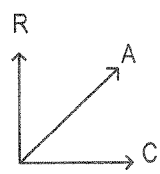

Referring now to FIG. 5A, an actuation system 500 can include an actuation ring 502 having two or more sections such as a first section 502A, a second section 502B, a third section 502C and a fourth section 502D. The sections of actuation ring 502 may be coupled together via two or more actuators 504, such as a first actuator 504A, a second actuator 504B, a third actuator 504C and a fourth actuator 504D. Thus, each section of actuation ring 502 may be actuated circumferentially relative to adjacent sections of actuation ring 502. For example, first section 502A may include a first flange 518 and second section 502B may include a second flange 520. Actuator 504B may be connected to at least one of first flange 518 or second flange 520. A gap 503 may exist between first section 502A and second section 502B. Second actuator 504B may be actuated to change the distance of gap 503. In response, BOAS 516 may move radially inward or radially outward relative to a case 520. BOAS 516 may be coupled to first section 502A via one or more radial guides 514, including a radial guide 514A.

Actuation ring 502 may resist flexing more than actuation ring 202 of FIG. 2 because actuation ring 502 includes two or more sections that can move relative to each other. In response to movement of two or more sections, no section of actuation ring 502 will have as large of a portion that will flex as actuation ring 202 of FIG. 2. Thus, actuation ring 502 provides benefits over actuation ring 202 of FIG. 2.

Figure 5B:
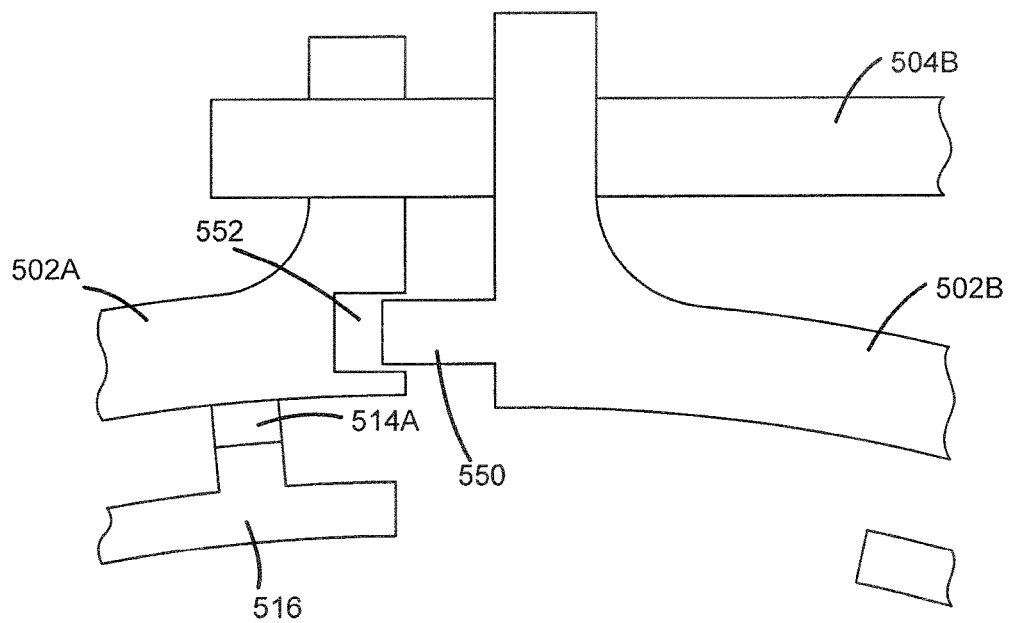
FIG. 5B is an enlarged view of a portion of the actuation system of FIG. 5A, in accordance with various embodiments.
Figure 5B:
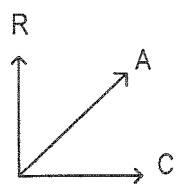

Referring now to FIGS. 5A and 5B, a shiplap feature may be included between each section of actuation ring 502. For example, first section 502A may include a shiplap slot 552 and second section 502B may include a shiplap finger 550. Shiplap finger 550 may be received by shiplap slot 552 such that first section 502A can move relative to second section 502B in response to actuation of second actuator 504B.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An actuation system for tip clearance control comprising:
    an actuation ring having a first end and a second end separated by a gap, the actuation ring being configured to be coupled to a blade outer air seal (BOAS), the actuation ring including at least one radial guide configured to be received by a radial guide acceptor of at least one of a forward BOAS support or an aft BOAS support; and
    an actuator coupled to at least one of the first end or the second end and configured to adjust a size of the gap such that a tip clearance between the BOAS and a blade tip is reduced in response to the size of the gap being reduced.

2. The actuation system of claim 1, wherein the actuation ring includes a first flange at the first end and a second flange at the second end and wherein the actuator is configured to be coupled to the first flange and the second flange and to adjust the size of the gap by changing a circumferential position of the first flange relative to the second flange.

3. The actuation system of claim 1, wherein the actuation ring has a first thickness proximal to the gap and a second thickness distal to the gap that is greater than the first thickness.

4. The actuation system of claim 1, wherein the first end of the actuation ring includes a first extension and the second end of the actuation ring includes a second extension positioned radially inward from the first extension to allow circumferential movement of the first end relative to the second end.

5. The actuation system of claim 1, wherein the actuation ring has a U-shaped cross section.

6. The actuation system of claim 1, further comprising the BOAS and a fastener configured to extend through the actuation ring and be received by and coupled to the BOAS.

7. The actuation system of claim 6, further comprising a sensor coupled to the fastener and wherein the fastener defines a waveguide such that the sensor can detect data corresponding to the tip clearance via the waveguide.

8. The actuation system of claim 7, wherein the sensor is a microwave sensor.

9. The actuation system of claim 6, further comprising a compressible feature configured to be positioned between the fastener and the actuation ring such that compression of the compressible feature by uneven movement of the actuation ring relative to the BOAS causes the BOAS to remain radially aligned with the blade tip.

10. The actuation system of claim 1, wherein a BOAS gap exists between the BOAS and at least one of the forward BOAS support or the aft BOAS support to allow radial movement of the BOAS relative to the at least one of the forward BOAS support or the aft BOAS support.

11. A turbine section of a gas turbine engine, comprising:
a turbine blade having a blade tip;
a blade outer air seal (BOAS); and
an actuation system comprising:
an actuation ring having a first end and a second end separated by a gap, the actuation ring being configured to be coupled to the BOAS, the actuation ring including at least one radial guide configured to be received by a radial guide acceptor of at least one of a forward BOAS support or an aft BOAS support, and
an actuator coupled to at least one of the first end or the second end and configured to adjust a size of the gap such that a tip clearance between the BOAS and the blade tip is reduced in response to the size of the gap being reduced.

12. The turbine section of claim 11, wherein the actuation ring includes a first flange at the first end and a second flange at the second end and wherein the actuator is configured to be coupled to the first flange and the second flange and to adjust the size of the gap by changing a circumferential position of the first flange relative to the second flange.

13. The turbine section of claim 11, wherein the actuation ring has a first thickness proximal to the gap and a second thickness distal to the gap that is greater than the first thickness.

14. The turbine section of claim 11, wherein the actuation system further includes a fastener configured to extend through the actuation ring and be received by and coupled to the BOAS.

15. The turbine section of claim 14, wherein the actuation system further includes a compressible feature configured to be positioned between the fastener and the actuation ring such that compression of the compressible feature by uneven movement of the actuation ring relative to the BOAS causes the BOAS to remain radially aligned with the blade tip.

16. The turbine section of claim 11, wherein a BOAS gap exists between the BOAS and at least one of the forward BOAS support or the aft BOAS support to allow radial movement of the BOAS relative to the at least one of the forward BOAS support or the aft BOAS support.

17. An actuation system for tip clearance control comprising:
an actuation ring having at least two sections each separated by a gap and being configured to be coupled to a blade outer air seal (BOAS), the actuation ring including at least one radial guide configured to be received by a radial guide acceptor of at least one of a forward BOAS support or an aft BOAS support; and
at least two actuators, each being configured to be coupled to at least one end of adjacent sections of the at least two sections and to adjust the gap between the adjacent sections such that a tip clearance between the BOAS and a blade tip is reduced in response to a size of each gap being reduced.

18. The actuation system of claim 17, wherein each of the at least two sections includes a shiplap finger and a shiplap slot configured to interface with adjacent shiplap fingers and shiplap slots to allow circumferential movement of each of the at least two sections relative to each other.

* * * * *